United States Patent [19] [11] 4,057,489
Montagna et al. [45] Nov. 8, 1977

[54] PROCESS FOR PRODUCING A TRANSFORMER OIL HAVING LOWER POUR POINT AND IMPROVED OXIDATION STABILITY

[75] Inventors: Angelo Anthony Montagna; Allen Evarts Somers; Raynor Tyler Sebulsky, all of Pittsburgh, Pa.

[73] Assignee: Gulf Research & Development Company, Pittsburgh, Pa.

[21] Appl. No.: 755,158

[22] Filed: Dec. 29, 1976

[51] Int. Cl.$^2$ ............................................. C10G 23/02
[52] U.S. Cl. ...................................... 208/89; 208/99; 208/111
[58] Field of Search ................... 208/89, 99, 58, 210, 208/212, 111

[56] References Cited

U.S. PATENT DOCUMENTS

| | | | |
|---|---|---|---|
| 3,487,005 | 12/1969 | Egan et al. | 208/89 |
| 3,494,854 | 2/1970 | Gallagher et al. | 208/89 |
| 3,516,925 | 6/1970 | Lawrence et al. | 208/111 |
| 3,912,620 | 10/1975 | Gallagher | 208/89 |
| 3,915,841 | 10/1975 | Murphy, Jr. et al. | 208/210 |
| 4,008,148 | 2/1977 | Masunaga et al. | 208/212 |

Primary Examiner—George Crasanakis

[57] ABSTRACT

Transformer oils having pour points below −40° F. (−40.00° C.) are produced by the process of reducing the nitrogen concentration of a petroleum hydrocarbon feed stock, contacting the denitrogenated product with a catalyst comprising a Group IV-B metal and a Group VIII noble metal on a decationized crystalline mordenite support under pour point reduction conditions of temperature, pressure and space velocity, and thereafter passing the product of the pour point reduction step to a lubricating oil oxidation stability step.

7 Claims, No Drawings

PROCESS FOR PRODUCING A TRANSFORMER OIL HAVING LOWER POUR POINT AND IMPROVED OXIDATION STABILITY

BACKGROUND OF THE INVENTION

In the production of transformer oils, British Petroleum Company has publicized the use of a catalytic process for the dewaxing of lubricating oils. The British Petroleum process, as described in U.S. Letters Pat. No. 3,516,925, employs a dual-function shape-selective zeolite hydrocracking catalyst consisting of platinum on H-mordenite to selectively hydrocrack normal or near-normal paraffinic hydrocarbons.

Although catalytic dewaxing processes such as proposed by British Petroleum appear to be attractive when compared with the relatively expensive low temperature solvent extraction processes presently being employed in conventional commercial operations, the commercial feasibility of any catalytic dewaxing process can be established only after the process has been found to be generally applicable to conventional refining streams and only after it has been demonstrated that the manufacturing costs of any such catalytic dewaxing process are competitive with conventional processes.

Catalyst stability, a problem associated with catalytic dewaxing processes of the prior art, must be established for the catalytic dewaxing process to be commercially competitive with conventional processes for the production of transformer oils. In addition to catalyst stability, product yields of the pour point reduction process must be maximized.

STATEMENT OF INVENTION

An improved process for obtaining transformer oils which comprises contacting a transformer oil feed stock containing less than 30 ppm nitrogen with a catalyst comprising a Group IV-B metal, a Group VIII noble metal, and a decationized mordenite support under pour point reduction conditions, and thereafter passing the product of the pour point reduction step to an oxidation stability process step.

DESCRIPTION OF THE INVENTION

The invention is applicable to the processing of petroleum lubricating oil feed stocks boiling generally in the range of 450° F. (232.22° C.) to 825° F. (440.56° C.) and having a Saybolt Universal viscosity at 100° F. (37.78° C.) in the range of 52 to 62 seconds. The feed stocks to the process of this invention are normally classified as light vacuum gas oils and comprise those distillate and deasphalted lube oil fractions derived from paraffinic or intermediate crudes which, optionally, could have been subjected to a solvent extraction process for the separation of aromatics therefrom or have been subjected to conventional hydrotreating processes such as described in U.S. Letters Pat. No. 3,761,388. As employed herein the term "paraffinic or intermediate" refers to the U.S. Bureau of Mines classification of crudes by E. C. Lane and E. L. Garton, Bureau of Mines Report of Investigations 3279, September, 1935.

If the lubricating oil feed stock contains a nitrogen concentration in excess of 30 ppm, the feed stock is contacted with a denitrogenation catalyst in the presence of hydrogen and under denitrogenation conditions of temperature, pressure and space velocity so as to obtain a product containing less than 30 ppm nitrogen. Preferably, the denitrogenated product contains less than 25 ppm nitrogen.

The catalyst employed in the denitrogenation process can comprise at least one hydrogenation component selected from Group VI-B and one hydrogenation component from Group VIII metals on a refractory oxide carrier in a form capable of promoting hydrogenation reactions. Especially effective catalysts are those containing nickel and tungsten on alumina. Other catalysts found to be effective include those containing nickel, cobalt, and molybdenum, nickel and molybdenum, and cobalt and molybdenum. The hydrogenating components of such catalysts can be employed in the sulfided or unsulfided form.

Although the hydrogenating components indicated above can be employed in any proportion with each other, especially effective catalysts are oxides or sulfides comprising (a) a combination of 5–25 percent by weight of a Group VI-B metal and (b) 5–20 percent by weight of one or more metals of Group VIII. The hydrogenating components can be composited with an inorganic refractory oxide support such as alumina or silica-alumina by methods known in the art. The catalyst composite as employed in the denitrogenation step can be shaped in the form of extrudates, granules, pellets, balls or the like.

The denitrogenation reaction can be conducted at a temperature in the range of 500° to 1,000° F. (260° to 538° C.), preferably, 550° to 800° F. (277° to 427° C.). The process is conducted by contacting the catalyst composite with the petroleum hydrocarbon feed in the presence of uncombined hydrogen partial pressures in the range of 200 to 4,000 psig (14.1 to 282 kg/cm$^2$). Hydrogen can be circulated through the reactor containing the catalyst bed at a rate between about 700 and 15,000 standard cubic feet per barrel of feed (12.4600 and 267.0 SCM/100 L) with the hydrogen purity of the circulating gaseous stream ranging from 60 to about 100 percent. The reaction can be continuously conducted at a liquid weight hourly space velocity in the range of 0.2 to 10. Reaction zone pressures in the range of 200 to 5,000 psig (14.1 to 353 kg/cm$^2$) are maintained in the denitrogenation zone.

Although the denitrogenation process step has been described as it relates to the use of a hydrogenation catalyst comprising one hydrogenating component selected from Group VI-B and one hydrogenating component from Group VIII metals on a refractory oxide carrier, it is of course within the scope of this invention to employ other catalysts in reducing the nitrogen concentration of the feed stock to less than 30 ppm. The petroleum lubricating oil feed stock containing less than 30 ppm nitrogen is subjected to a pour point reduction process employing a catalyst comprising a Group IV-B metal, a Group VIII noble metal, and a decationized crystalline mordenite support. The preferred Group IV-B metal is titanium and the preferred Group VIII noble metal is palladium.

The crystalline mordenite should have pore openings at least 5 A in diameter, preferably 7 – 9 A in diameter, with the sodium cations having been replaced by hydrogen to obtain a "decationized" mordenite. The decationization treatment of the mordenite is conventionally obtained by exchanging the sodium form of the mordenite with ammonium cations. The ammonium form can then be heated to drive off ammonia leaving behind the hydrogen form or decationized mordenite. Preferably, the metal cation content of the decationized mordenite is reduced to an amount not exceeding 2.0 weight percent, more preferably, not exceeding 0.5 weight percent of the mordenite.

The nobel metal hydrogenation component from Group VIII can be incorporated into the mordenite by impregnation or cation exchange. Ammonium or amine complexes of the noble metals can be used for exchanging in acidic solutions. The noble metals are employed in amounts of about 0.01 to 5.0 weight percent, preferably 0.1 to 2.0 weight percent of the catalyst composite.

The Group IV-B metal can be conveniently incorporated into the mordenite by impregnation from an aqueous solution of a salt of the Group IV-B metal. When employing titanium as the Group IV-B metal, for example, suitable titanium salts include titanium trichloride, titanium oxalate, and titanium tetrachloride. If titanium tetrachloride is employed, the aqueous carrier should contain a concentration of ammonia to maintain the titanium tetrachloride dispersed throughout the aqueous phase. The Group IV-B metal is added to the mordenite so as to obtain a concentration of the metal in the range of 0.1 to 10.0 weight percent, preferably 0.2 to 2.5 weight percent.

Following impregnation of the Group IV-B metal on the mordenite, the mordenite containing the Group VIII and Group IV-B metals can be subjected to conventional drying and calcination steps. The deposition of the Group IV-B metal on the support can precede or follow compositing of the Group VIII noble metal with the mordenite. The Group VIII noble metal and the Group IV-B metal can also be deposited simultaneously on the mordenite. Preferably, intermediate drying and calcining steps are employed in the sequential addition of the Group VIII and Group IV-B metals to the mordenite.

Preferably the hydrogenation metals of the pour point reduction catalyst compositions are employed in the sulfided form. The catalyst composition can be presulfided by treating the calcined catalyst with hydrogen sulfide or preferably a mixture of hydrogen and hydrogen sulfide at a temperature normally in the range of about 300° to 750° F. (149° to 399° C.) or more and at a pressure ranging from atmospheric to 3,000 psig (211 kg/cm$^2$). When employing a mixture of hydrogen and hydrogen sulfide as a presulfiding gaseous mixture, the concentration of hydrogen sulfide will normally range from about 5 to about 20 percent by volume. Other conventional methods can be employed to presulfide the catalyst composite.

The pour point reduction catalyst is contacted with the feed containing less than 30 ppm nitrogen at a temperature in the range of 450° to 700° F. (232.2° to 371.11° C.), preferably 500° to 600° F. (260° to 315.56° C.), in the presence of hydrogen. Hydrogen partial pressures in the range of 500 to 2,000 psig (35.00 to 140 kg/cm$^2$), preferably 1,000 to 1,500 psig (70.00 to 105 kg/cm$^2$), are employed in the pour point reduction zone and the hydrogen circulation rate through the zone is maintained in the range of 1,000 to 10,000 standard cubic feet per barrel of feed (17.8 to 178. SCM/100 L). A liquid hourly space velocity in the range of 0.2 to 10.0, preferably 0.5 to 2.0, is maintained in the pour point reduction zone. The pour point reduction process step is conducted to obtain a product wherein from 8 to 30 weight percent, preferably 12 to 20 weight percent, of the feed has been converted to products boiling below 450° F. (232.22° C.).

The transformer oil product fraction, separated from that portion of the pour point reduction process product boiling below 450° F. (232.22° C.), is thereafter subjected to an oxidation stabilization step such as a conventional clay finishing step or a conventional hydrofinishing process. Clay finishing can be accomplished by employing a clay such as fuller's earth, bauxite, Attapulgus or Filtrol's clays which have been previously activated for filtering and decolorizing purposes by roasting at temperatures in the order of 400° to 900° F. (204.44° to 482.22° C.). Normally, filtration of the transformer oil product of the pour point reduction step to a clay life of 100 barrels of oil per ton of clay is satisfactory, but filtration to a clay life as much as 250 barrels or more per ton can be employed. Normally, clay treating is conducted at ambient atmospheric temperatures, but moderately elevated temperatures can also be used.

Alternatively, the oxidation stability process step can be effected by a hydrofinishing process which operates primarily for the removal of minor quantities of contaminants and color-forming bodies. Thus, the hydrofinishing step is employed to reduce the sulfur content of the transformer oil feed stock along with other contaminants and color-forming bodies but does not result in any significant increase in API gravity or any significant reduction in the boiling range of the treated material.

The hydrofinishing operating conditions employed normally include a temperature from about 400° to about 850° F. (204.44 to 454.44° C.), a pressure in the range from about 800 to about 3,000 psig (56.00 to 210 kg/cm$^2$), a liquid hourly space velocity in the range from about 0.1 to about 10.0 and a hydrogen circulation rate in the range from about 1,000 to about 20,000 standard cubic feet per barrel (17.8 to 356. SCM/100 L). In the hydrofinishing process step, the transformer oil feed stock is contacted with a catalyst which can be any of the hydrofinishing catalysts well-known in the art such as, for example, Group VI and Group VIII metals, their oxides and sulfides, or mixtures thereof, supported on a suitable carrier which has extremely low-cracking activity. A preferred carrier is alumina.

The following examples are presented to illustrate objects and advantages of the invention. It is not intended, however, to limit the invention to specific embodiments presented therein.

EXAMPLE I

In this Example, the effectiveness of the invention to produce a transformer oil having a pour point of −80° F. (−62.22° C.) from a paraffinic light vacuum gas oil containing 130 ppm total nitrogen is demonstrated. The paraffinic light vacuum gas oil characterized below in Table I was passed through a denitrogenation zone containing a catalyst comprising 6.0 weight percent nickel and 19.0 weight percent tungsten on alumina. A denitrogenation hydrogen pressure in the range of 1,000 to 1,500 psig (70 to 105 kg/cm$^2$) and a temperature in the range of 710° to 735° F. (376.7° to 390.5° C) was maintained in the denitrogenation zone. A space velocity of 1.5 to 1.75 volumes of feed per volume of catalyst per hour was also maintained in the denitrogenation zone. The product withdrawn from the denitrogenation zone contained less than 1 ppm nitrogen and characteristics of the denitrogenated product are also presented below in Table I.

TABLE I

| | Feed | Product |
|---|---|---|
| Yield: vol. % | 100.0 | 95.3 |
| Gravity: °API | 30.2 | 32.4 |
| Viscosity, SUV: Sec. | | |
| 100° F. (37.78° C) | 61.1 | 60.7 |
| Nitrogen: ppm | 135 | 0.8 |
| Sulfur: wt. % | 0.21 | <0.04 |
| Pour Point: °F. | +40 (+4.44° C.) | +40 (+4.44° C.) |
| Distillation: °F. | | |
| (ASTM D1160) | | |
| Overpoint | 476 (246.67° C.) | — |
| 10% | 583 (306.11° C.) | 576 (302.22° C.) |
| 30 | 642 (338.89° C.) | 643 (339.44° C.) |
| 50 | 682 (361.11° C.) | 674 (356.67° C.) |
| End Point | 804 (428.89° C.) | 807 (430.56° C.) |

In the pour point reduction step a catalyst comprising 0.5 weight percent titanium and 1.0 weight percent palladium on H-mordenite (Norton Type 900 H Zeolon) was employed. The catalyst was prereduced in a hydrogen atmosphere at 900° F. (482.22° C.) for one hour and sulfided with a mixture of 90 volume percent hydrogen and 10 volume percent hydrogen sulfide at 550° F. (287.8° C.) for a period of eight hours.

The pour point reduction catalyst was contacted with the denitrogenated feed under pour point reduction conditions comprising a hydrogen partial pressure of 850 psig (59.8 kg/cm²), a temperature of 576° C. (302.2° C.), a liquid hourly space velocity of 1.0 and a hydrogen circulation rate of 4,250 standard cubic feet per barrel of feed (75.7 SCM/100 L). The transformer oil product had the properties shown below in Table II.

TABLE II

| | Transformer Oil Product | |
|---|---|---|
| Yield: vol. % | 80.6 | |
| Gravity: °API | 29.5 | |
| Viscosity, SUV: Sec. | | |
| 100° F. (37.78° C.) | 67.5 | |
| 210° F. (98.89° C.) | 35.5 | |
| Pour Point: °F. | −80 | (−62.22° C.) |
| Distillation: °F. | | |
| (D1160) | | |
| 10% | 584 | (306.67° C.) |
| 30 | 636 | (335.56° C.) |
| 50 | 680 | (360° C.) |
| End Point | 805 | (429.44° C.) |

EXAMPLE II

This Example demonstrates the criticality of titanium in the catalyst composition when employed in the pour point reduction of a transformer oil feed stock characterized as follows:

TABLE III

| Viscosity: | | |
|---|---|---|
| SUS at 100° F. (37.78° C.) | 56.5 | |
| SUS at 210° F. (98.89° C.) | 34.2 | |
| Pour Point: °F. | +30 | (−1.11° C.) |
| Flash Point, COC: °F. | 295 | (146.11° C.) |
| Gravity: °API | 30.5 | |
| Color, ASTM D1500 | L<0.5 | |
| Nitrogen: ppm | <5 | |
| Sulfur: ppm | <10 | |

Two runs were made. In the first run (Run No. 2), a catalyst comprising 0.39 weight percent platinum ion exchanged in Zeolon 100-H powder was employed. In the second run (Run No. 3), a catalyst comprising 0.38 weight percent platinum ion exchanged in the same Zeolon 100-H powder, impregnated with 0.36 weight percent titanium, was employed. In each of the pour point reduction runs, a temperature of 575° F. (301.67° C.), a pressure of 1,500 psi (105 kg/cm²), a hydrogen flow rate of 10,000 standard cubic feet per barrel (178. SCM/100 L), and a liquid hourly space velocity of 2.5 was employed. Each of the runs was conducted for a period of 90 hours.

During Run No. 2, the transformer oil product withdrawn from the pour point reduction zone averaged 90 volume percent of the feed and the pour point of the product averaged −90° F. (−67.78° C.). In Run No. 3, the average yield of the transformer oil product withdrawn from pour point reduction zone averaged 90 volume percent based on the feed and the average pour point of the transformer oil product was −100° F. (−73.33° C.). A comparison of the two runs shows that by the employment of a catalyst containing titanium, a pour point reduction improvement of 10° F. (−12.22° C.) was obtained.

EXAMPLE III

In this Example, the effectiveness of the invention to produce a transformer oil product from a hydrotreated lubricating oil feed stock is demonstrated. The product of the hydrotreating process which comprises the feed stock to the pour point reduction run of this Example, was characterized as follows:

TABLE IV

| Gravity: °API | — | 34.1 | |
|---|---|---|---|
| Viscosity, SUV: Sec. | | | |
| 100° F. (37.78° C.) | | 52.3 | |
| 210° F. (98.89° C.) | | 33.6 | |
| Viscosity Index | | 99 | |
| Color, ASTM D1500 | | L0.5 | |
| Color, Saybolt, ASTM D156 | | — | |
| Nitrogen (Total): ppm | | 0.7 | |
| Sulfur: ppm | | 19 | |
| Pour Point: °F. | | +40 | (+4.44° C.) |
| Cloud Point: °F. | | — | |
| Flash, COC: °F. | | 270 | (132.22° C.) |

In the run (Run No. 4) of this Example, the hydrotreated feed stock was passed through a pour point reduction zone containing a catalyst comprising one/sixteenth inch extrudates consisting of 0.5 weight percent titanium and 1.0 weight percent palladium on H-mordenite. Operating conditions included a temperature of 601° F. (316.11° C.), a hydrogen pressure of 1,529 psig (107.10 kg/cm²), a gas circulation rate of 5,046 standard cubic feet per barrel of feed (89.8188 SCM/100 L), a liquid hourly space velocity of 0.99 and a hydrogen consumption of 629 standard cubic feet per barrel of feed (11.1962 SCM/100 L).

The pour point reduction process step was operated so as to convert 23.1 weight percent of the feed to a product fraction boiling below that of the feed stock passed to the pour point reduction step. The transformer oil product withdrawn from the pour point reduction zone was characterized as follows:

TABLE V

| | |
|---|---|
| Gravity: ° API | 33.0 |
| Viscosity, SUV: Sec. | |
| 100° F. (37.78° C.) | 51.4 |
| 210° F. (98.89° C.) | 33.3 |
| Color, Saybolt, ASTM D156 | +22 |
| Nitrogen (Total): ppm | 0.2 |
| Sulfur: ppm | 8.4 |
| Pour Point: ° F. | −50 (−45.56° C.) |
| Cloud Point: ° F. | <−50 (−45.56° C.) |
| Flash, COC: ° F. | 265 (129.44° C.) |
| Distillation: ASTM D1160 | |
| Over Point: ° F. | 338 (170° C.) |
| End Point | 724 (384.44° C.) |
| 5% Cond. at: ° F. | 553 (289.44° C.) |
| 10 | 590 (310° C.) |
| 20 | 612 (322.22° C.) |
| 30 | 626 (330° C.) |
| 40 | 634 (334.44° C.) |
| 50 | 641 (338.33° C.) |
| 60 | 647 (341.67° C.) |
| 70 | 655 (346.11° C.) |
| 80 | 667 (352.78° C.) |
| 90 | 685 (362.78° C.) |
| 95 | 701 (371.67° C.) |

EXAMPLE IV

In this Example, the effectiveness of the inventive process to produce a stabilized transformer oil product from a feed containing 135 ppm nitrogen is demonstrated. The feed to the pretreatment or denitrogenation process step was characterized as shown below in Table VI. In the denitrogenation process step, a catalyst comprising 6.0 weight percent nickel and 19.0 weight percent tungsten on alumina was contacted with the feed at a temperature of 729° F. (387.22° C.), a hydrogen pressure of 1,500 psig (105 kg/cm$^2$), a gas circulation rate of 5,000 standard cubic feet per barrel of feed (89.8188 SCM/100 L), and a liquid hourly space velocity of 1.5. Hydrogen consumption during the denitrogenation run was 331 standard cubic feet per barrel of feed (5.8918 SCM/100 L). The lubricating oil product of the denitrogenation step was characterized as shown below in Table VI.

TABLE VI

| | Feed | Product |
|---|---|---|
| Yield: Vol. % | 100.0 | 95.3 |
| gravity: ° API | 30.2 | 32.4 |
| Viscosity, SUV: Sec. | | |
| 100° F. (37.78° C.) | 61.1 | 60.7 |
| Color, Saybolt (D1500) | −1.0 | −16 |
| Total Nitrogen: ppm | 135 | 2.3 |
| Basic Nitrogen: ppm | 66 | — |
| Sulfur: wt. % | 0.21 | <0.04 |
| Pour Point: ° F. | +40 (+4.44° C.) | +40 (+4.44° C.) |
| Distillation: D1160 | | |
| Overpoint: ° F. | 476 (246.67° C.) | — |
| Endpoint | 804 (428.89° C.) | 807 (430.56° C.) |
| 10% | 583 (306.11° C.) | 576 (302.22° C.) |
| 30 | 642 (338.89° C.) | 643 (339.44° C.) |
| 50 | 682 (361.11° C.) | 674 (356.67° C.) |

The denitrogenated lubricating oil product was thereafter contacted with a catalyst comprising 0.5 weight percent titanium and 1.0 weight percent palladium on H-mordenite under pour point reduction operating conditions. The pour point reduction operating conditions comprised a temperature of 540° F. (282.22° C.), a hydrogen pressure of 1,500 psig (105 kg/cm$^2$), a gas circulation rate of 5,000 standard cubic feet per barrel (89.8188 SCM/100 L), a liquid hourly space velocity of 1.0 and a hydrogen consumption rate of 264 standard cubic feet per barrel of feed (4.6992 SCM/100 L). 17.6 weight percent of the feed to the pour point reduction process step was converted to products boiling below that of the feed to the pour point reduction step. The properties of the transformer oil product of the pour point reduction step are shown below in Table VII.

TABLE VII

| Product Inspections | |
|---|---|
| Gravity: ° API | 30.3 |
| Viscosity, SUV: Sec. | |
| 100° F. (37.78° C.) | 65.6 |
| 210° F. (98.89° C.) | 35.3 |
| Color, Saybolt | +22 |
| Nitrogen: ppm | 2.0 |
| Sulfur: wt. % | <0.04 |
| Pour Point: ° F. | −45 (−42.78° C.) |
| Cloud Point: ° F. | −40 (−40.00° C.) |
| Flash Point: ° F. | 300 (148.89° C.) |
| Distillation: D1160 | |
| Endpoint: ° F. | 802 (427.78° C.) |
| 10% at ° F. | 598 (314.44° C.) |
| 30 | 646 (341.11° C.) |
| 50 | 669 (353.89° C.) |
| 70 | 702 (372.22° C.) |
| 90 | 754 (401.11° C.) |

Stability tests were conducted on the pour point reduction product and after the addition of 0.075 weight percent of an additive identified as GA-046 with the results shown below in Table VIII. Thereafter, the product of the pour point reduction step containing the additive was subjected to filtering to 100 barrels per ton employing a clay identified as No. 1 Floridin Clay. An ambient temperature of 75° F. (23.89° c.) was employed during the clay filtering step. The results of the stability tests conducted on the clay treated transformer oil product are also shown below in Table VIII.

TABLE VIII

| Inspections | Untreated (without additive) | Untreated (with additive) | Clay Treated |
|---|---|---|---|
| Flash Point: COC, ° F. | 300 (148.89° C.) | | |
| Pour Point: ° F. | −45 (−42.78° C.) | | |
| Viscosity, Kin: mm$^2$/s | | | |
| 100° C. | 2.70 | | |
| 40° C. | 11.0 | | |
| Dielectric Strength, D877: Kv | 36 | | |
| Power Factor, 100° C.: % | 0.32 | | 0.04 |
| 25° C. | | | 0.003 |
| Oxidation Stability, D2440 | | | |
| 72 Hours | | | |
| Sludge: % | 4.10 | 0.016 | 0.001 |
| Tan | 6.55 | 0.08 | 0.11 |

TABLE VIII-continued

| Inspections | Untreated (without additive) | Untreated (with additive) | Clay Treated |
|---|---|---|---|
| Rotary Bomb Test, D2122 140° C: Minutes | 45 | 207 | 212 |

Although the invention has been described with reference to specific embodiments, references, and details, various modifications and changes will be apparent to one skilled in the art and are contemplated to be embraced in this invention.

We claim:

1. A process for producing a transformer oil having a lower pour point and improved oxidation stability which comprises contacting a petroleum lubricating oil feed having a nitrogen concentration of less than 30 ppm and having a Saybolt Universal viscosity at 100° F. in the range of 52 to 62 seconds with hydrogen and a pour point reduction catalyst under pour point reduction reaction conditions, said pour point reduction catalyst comprising a Group IV-B metal, a Group VIII noble metal, and a decationized mordenite support, said pour point reduction reaction conditions providing for a lubricating oil product wherein from 8 to 30 weight percent of said oil feed has been converted to products boiling below 450° F., and subjecting said lubricating oil product having a lower pour point to an oxidation stabilization step to provide said transformer oil.

2. The process of claim 1 wherein said Group IV-B metal comprises titanium.

3. The process of claim 2 wherein said Group VIII noble metal comprises palladium.

4. The process of claim 1 wherein said pour point reduction reaction conditions include a temperature in the range of 450° to 700° F., a hydrogen partial pressure in the range of 500 to 2,000 psig, a hydrogen circulation rate in the range of 1,000 to 10,000 standard cubic feet per barrel, and a liquid hourly space velocity in the range of 0.2 to 10.

5. A process for producing a transformer oil having a lower pour point and improved oxidation stability which comprises contacting a petroleum lubricating oil feed having a nitrogen concentration greater than 30 ppm and having a Saybolt Universal viscosity at 100° F. in the range of 52 to 62 seconds with hydrogen and a denitrogenation catalyst in a denitrogenatin zone under hydrodenitrogenation reaction conditions, recovering a lubricating oil product from said hydrodenitrogenation reaction containing less than 30 ppm nitrogen, contacting said lubricating oil from said hydrodenitrogenation reaction with hydrogen and a pour point reduction catalyst under pour point reduction reaction conditions, said pour point reduction catalyst comprising a Group IV-B metal, a Group VIII noble metal, and a decationized mordenite support, said pour point reduction reaction conditions providing for a lubricating oil product wherein from 8 to 30 weight percent of said oil feed has been converted to products boiling below 450° F., and subjecting said lubricating oil product having a lower pour point to an oxidation stabilization step to provide said transformer oil.

6. The process of claim 5 wherein said denitrogenation catalyst comprises at least one metal, metal oxide or metal sulfide selected from Group VI-B metals and at least one metal, metal oxide or metal sulfide selected from Group VIII metals on a refractory oxide carrier, and wherein said hydrodenitrogenation reaction conditions include a temperature in the range of 500° to 1,000° F., a hydrogen partial pressure in the range of 200 to 4,000 psig, a hydrogen circulation rate between 700 to 15,000 standard cubic feet per barrel of feed, and a liquid hourly weight space velocity in the range of 0.2 to 10.

7. The process of claim 6 wherein said oxidation stabilization step comprises a clay finishing step.

* * * * *